United States Patent
Yasumoto

(10) Patent No.: US 12,528,645 B2
(45) Date of Patent: Jan. 20, 2026

(54) TRAVELING VEHICLE SYSTEM AND TRAVELING VEHICLE

(71) Applicant: MURATA MACHINERY, LTD., Kyoto (JP)

(72) Inventor: Hiroyuki Yasumoto, Ise (JP)

(73) Assignee: MURATA MACHINERY, LTD., Kyoto (JP)

( * ) Notice: Subject to any disclaimer, the term of this patent is extended or adjusted under 35 U.S.C. 154(b) by 73 days.

(21) Appl. No.: 18/689,153

(22) PCT Filed: Jul. 25, 2022

(86) PCT No.: PCT/JP2022/028649
§ 371 (c)(1),
(2) Date: Mar. 5, 2024

(87) PCT Pub. No.: WO2023/037773
PCT Pub. Date: Mar. 16, 2023

(65) Prior Publication Data
US 2024/0375866 A1    Nov. 14, 2024

(30) Foreign Application Priority Data
Sep. 9, 2021  (JP) .................................. 2021-146864

(51) Int. Cl.
*B65G 1/04* (2006.01)
*B65G 43/02* (2006.01)

(52) U.S. Cl.
CPC .......... *B65G 1/0457* (2013.01); *B65G 43/02* (2013.01)

(58) Field of Classification Search
CPC . B65G 1/0457; B65G 43/02; H01L 21/67259; H01L 21/67733;
(Continued)

(56) References Cited

U.S. PATENT DOCUMENTS

2005/0046584 A1* 3/2005 Breed ................ B60N 2/02246
340/13.31
2006/0208169 A1* 9/2006 Breed ..................... G01S 15/88
250/221

(Continued)

FOREIGN PATENT DOCUMENTS

JP       2001-091246 A    4/2001
JP       2003-212493 A    7/2003
(Continued)

OTHER PUBLICATIONS

Official Communication issued in International Patent Application No. PCT/JP2022/028649, mailed on Oct. 11, 2022.
(Continued)

*Primary Examiner* — Russell Frejd
(74) *Attorney, Agent, or Firm* — Keating & Bennett, LLP

(57) ABSTRACT

A traveling vehicle system includes a traveling vehicle including a reflective sensor and an image-capturing device, a storage to store an image including a specific object, a determiner to determine whether an object detected by the sensor is the specific object, based on a captured image captured by the image-capturing device when the object has been detected by the sensor and on the image stored in the storage, and a traveling controller configured or programmed to execute collision avoidance control when the object has been detected by the sensor and stop execution of the collision avoidance control in a case where the determiner has determined that the object detected by the sensor is the specific object.

16 Claims, 6 Drawing Sheets

(58) Field of Classification Search
CPC .... H01L 21/67276; G05D 1/43; G05D 1/693;
G05D 2107/70
See application file for complete search history.

(56) References Cited

U.S. PATENT DOCUMENTS

| | | | |
|---|---|---|---|
| 2016/0289002 A1 | 10/2016 | Morikawa | |
| 2019/0248414 A1* | 8/2019 | Ohtani | ............... B62D 15/0285 |
| 2021/0316788 A1* | 10/2021 | Ohtani | ............... B62D 15/0285 |
| 2022/0171275 A1* | 6/2022 | Iida | ..................... H04N 23/58 |

FOREIGN PATENT DOCUMENTS

| | | |
|---|---|---|
| JP | 2009-237866 A | 10/2009 |
| JP | 2018-136844 A | 8/2018 |
| JP | 2020-149186 A | 9/2020 |
| JP | 2021-015517 A | 2/2021 |

OTHER PUBLICATIONS

Official Communication issued in International Patent Application No. PCT/JP2022/028649, mailed on Mar. 14, 2024.
English translation of Official Communication issued in International Patent Application No. PCT/JP2022/028649, mailed on Jul. 3, 2023.

* cited by examiner

TRAVELING VEHICLE SYSTEM AND TRAVELING VEHICLE

BACKGROUND OF THE INVENTION

1. Field of the Invention

Aspects of the present invention relate to traveling vehicle systems and traveling vehicles.

2. Description of the Related Art

A traveling vehicle configured to travel on a track and transport an article is known. The traveling vehicle may be provided with a sensor configured to detect an obstacle that may hinder the traveling vehicle from traveling on the track, and traveling of the traveling vehicle may be controlled based on whether the sensor has detected the obstacle. Japanese Unexamined Patent Publication No. 2009-237866 discloses a traveling vehicle system (transport system) in which collision avoidance control, such as causing the traveling vehicle to stop traveling or slow down, is executed based on a detection result of a sensor.

SUMMARY OF THE INVENTION

However, in the above-described conventional traveling vehicle system, an object that does not actually hinder traveling of the traveling vehicle may be detected by the sensor and collision avoidance control may be executed. For example, when the collision avoidance control has been executed, the traveling vehicle travels at a reduced speed. When the positional relation between the traveling vehicle and the object has changed and accordingly the object is no longer detected as an obstacle by the sensor, the traveling vehicle will accelerate to return to its normal traveling state. Such unnecessary execution of the collision avoidance control may lower the performance of the traveling vehicle system.

In view of this, example embodiments of the present invention provide traveling vehicle systems and traveling vehicles that, while preventing collision with an obstacle, reduce unnecessary execution of collision avoidance control when a sensor has detected an object that is not an obstacle.

A traveling vehicle system according to an aspect of an example embodiment of the present invention is a traveling vehicle system in which a plurality of traveling vehicles travel along a predetermined traveling path. The traveling vehicle system includes the traveling vehicles each including a reflective sensor to detect a presence of an object preceding in a traveling direction and a distance to the object and an image-capturing device to capture an image of an area preceding in the traveling direction, a storage to store an image including a specific object that does not become an obstacle to traveling of each traveling vehicle, a determination controller configured or programmed to determine whether the object detected by the sensor is the specific object, based on a captured image captured by the image-capturing device when the object has been detected by the sensor and on the image stored in the storage, and a traveling controller configured or programmed to execute collision avoidance control when the object has been detected by the sensor and stop execution of the collision avoidance control in a case where the determination controller has determined that the object detected by the sensor is the specific object.

The collision avoidance control may be executed when the object has been detected by the sensor, and thus the traveling vehicle can be prevented from colliding with an obstacle. Furthermore, the execution of the collision avoidance control may be stopped if the object detected by the sensor has been determined to be the specific object that does not hinder traveling of the traveling vehicle, and thus unnecessary execution of the collision avoidance control when the sensor has detected an object that is not an obstacle can be reduced.

The traveling controller may be configured or programmed to execute the collision avoidance control when the object has been detected by the sensor and the traveling vehicle approaches until the distance to the object reaches a predetermined distance, and may stop the execution of the collision avoidance control in a case where the determination controller has determined that the object detected by the sensor is the specific object before the traveling vehicle approaches until the distance to the object reaches the predetermined distance. With this configuration, unnecessary execution of the collision avoidance control described above can be avoided even when the determination by the determination controller takes time.

The storage may store the image corresponding to each position on the traveling path. The way the above-described specific object is visible differs depending on positions on the traveling path, i.e., the way it is captured by the image-capturing device differs. However, in this configuration, whether the object is the specific object is determined based on the image including the specific object that is captured at high possibility at the time when it has been detected by the sensor, and thus determination accuracy can be increased.

A traveling vehicle system according to an aspect of an example embodiment of the present invention may further include an updating controller configured or programmed to, when the determination controller has determined that the object detected by the sensor is the specific object, store the captured image used for the concerned determination in the storage. With this configuration, whether the object is the specific object can be determined based on an image corresponding to a site where the traveling vehicle is actually traveling, and thus the accuracy of the determination by the determination controller can be further increased.

A detection range of the sensor may be set to switch in accordance with a traveling position, and the determination controller may be configured or programmed to determine whether the object detected by the sensor is the specific object, based on a partial image that falls within the detection range of the sensor out of an entirety of the captured image and on the image stored in the storage. With this configuration, the object detected by the sensor can be reliably included in the captured image to be determined by the determination controller, and also whether the object detected by the sensor is the specific object can be efficiently determined.

The collision avoidance control may be control to decelerate or stop the traveling vehicle. With this configuration, collision with a preceding traveling vehicle or a preceding obstacle can be avoided.

A traveling vehicle according to an aspect of an example embodiment of the present invention is a traveling vehicle to travel along a predetermined traveling path. The traveling vehicle includes a reflective sensor to detect a presence of an object preceding in a traveling direction and a distance to the object, an image-capturing device to capture an image of an area preceding in the traveling direction, a storage to store an image including a specific object that does not become an obstacle to traveling of the traveling vehicle, a determination controller configured or programmed to determine whether the object detected by the sensor is the specific object, based on a captured image captured by the image-capturing device when the object has been detected by the sensor and on the image stored in the storage, and a traveling controller configured or programmed to execute collision avoidance control when the object has been detected by the sensor and stop execution of the collision avoidance control in a case where the determination controller has determined that the object detected by the sensor is the specific object.

The collision avoidance control is executed when the object has been detected by the sensor, and thus collision with an obstacle can be prevented. Furthermore, in this configuration, the execution of the collision avoidance control is stopped if the object detected by the sensor has been determined to be the specific object that does not hinder traveling of the traveling vehicle, and thus unnecessary execution of the collision avoidance control can be reduced.

According to aspects of example embodiments of the present invention, while preventing collision with an obstacle, it is possible to reduce the unnecessary execution of the collision avoidance control due to detection of the object that is not an obstacle.

The above and other elements, features, steps, characteristics and advantages of the present invention will become more apparent from the following detailed description of the example embodiments with reference to the attached drawings.

DETAILED DESCRIPTION OF EXAMPLE EMBODIMENTS

Example embodiments according to the present invention will be described in detail below with reference to the drawings. In the description of the drawings, identical elements will be denoted by identical reference signs and redundant explanations will be omitted.

Figure 1:
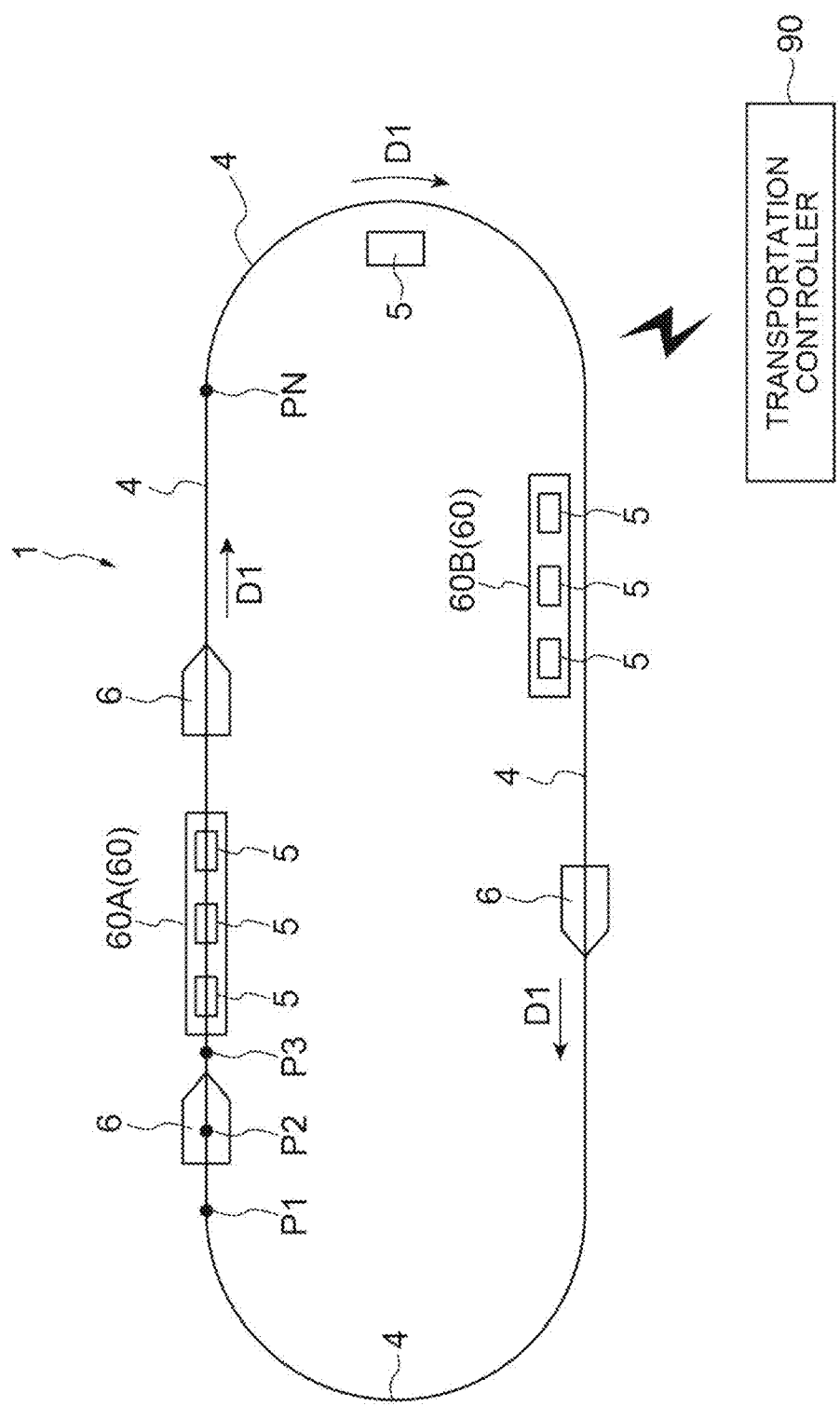
FIG. 1 is a schematic diagram illustrating a configuration of a traveling vehicle system according to an example embodiment of the present invention.

As illustrated in FIG. 1, a traveling vehicle system 1 is a system to transport an article by using an overhead traveling vehicle 6 (hereinafter, referred to as "traveling vehicle 6") movable along a track 4. Examples of the article include a container 10 (see FIG. 2) such as a front opening unified pod (FOUP) configured to store a plurality of semiconductor wafers and a reticle pod configured to store a glass substrate. On the container 10, a flange 10A (see FIG. 2) that is a portion to be gripped by a chuck 30A (see FIG. 2) described later in detail is provided. The traveling vehicle system 1 includes the track 4, a plurality of the traveling vehicles 6, and a transportation controller 90.

Figure 2:
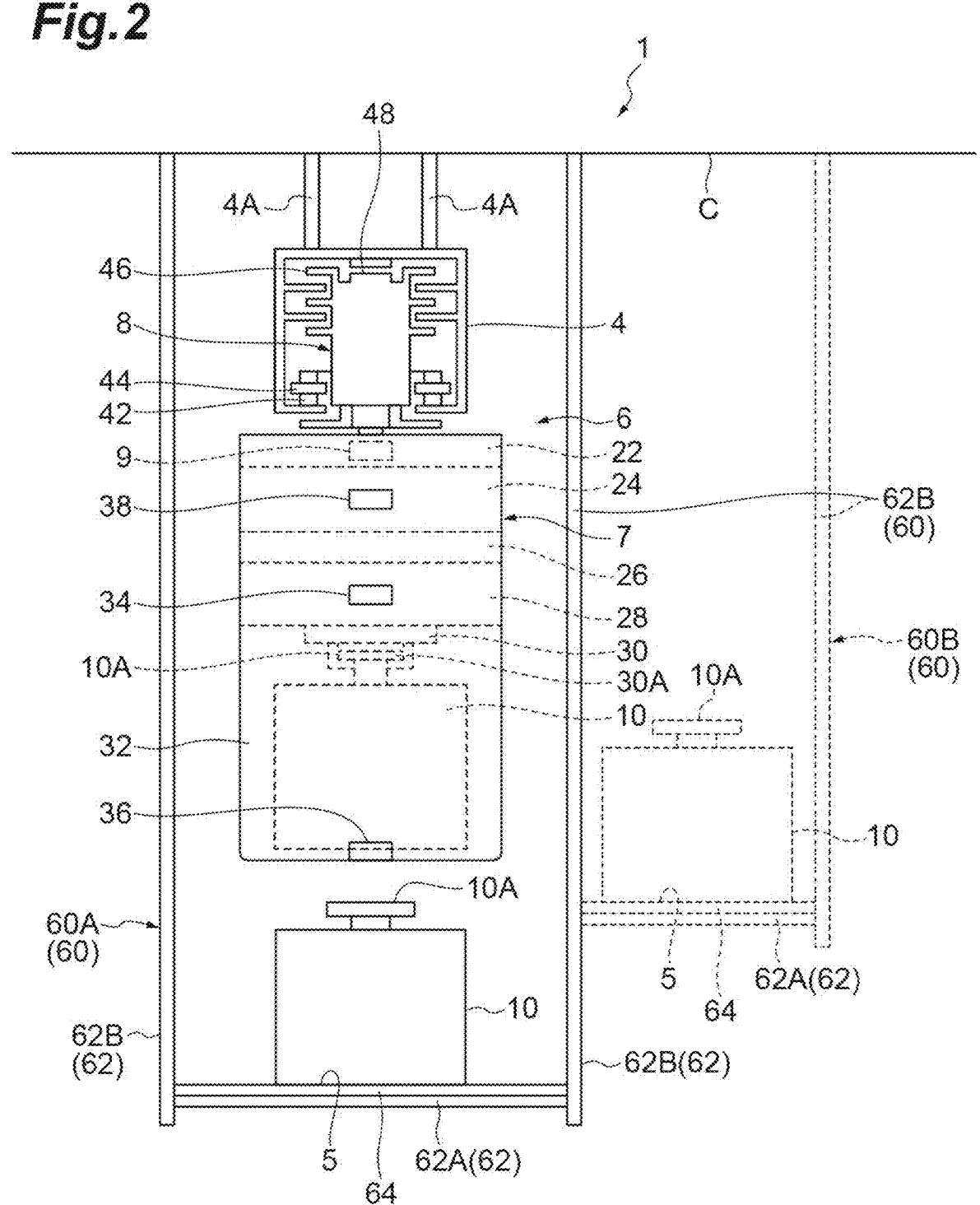
FIG. 2 is a front view of a traveling vehicle and a placement section when viewed from the front in a traveling direction.
Figure 3:
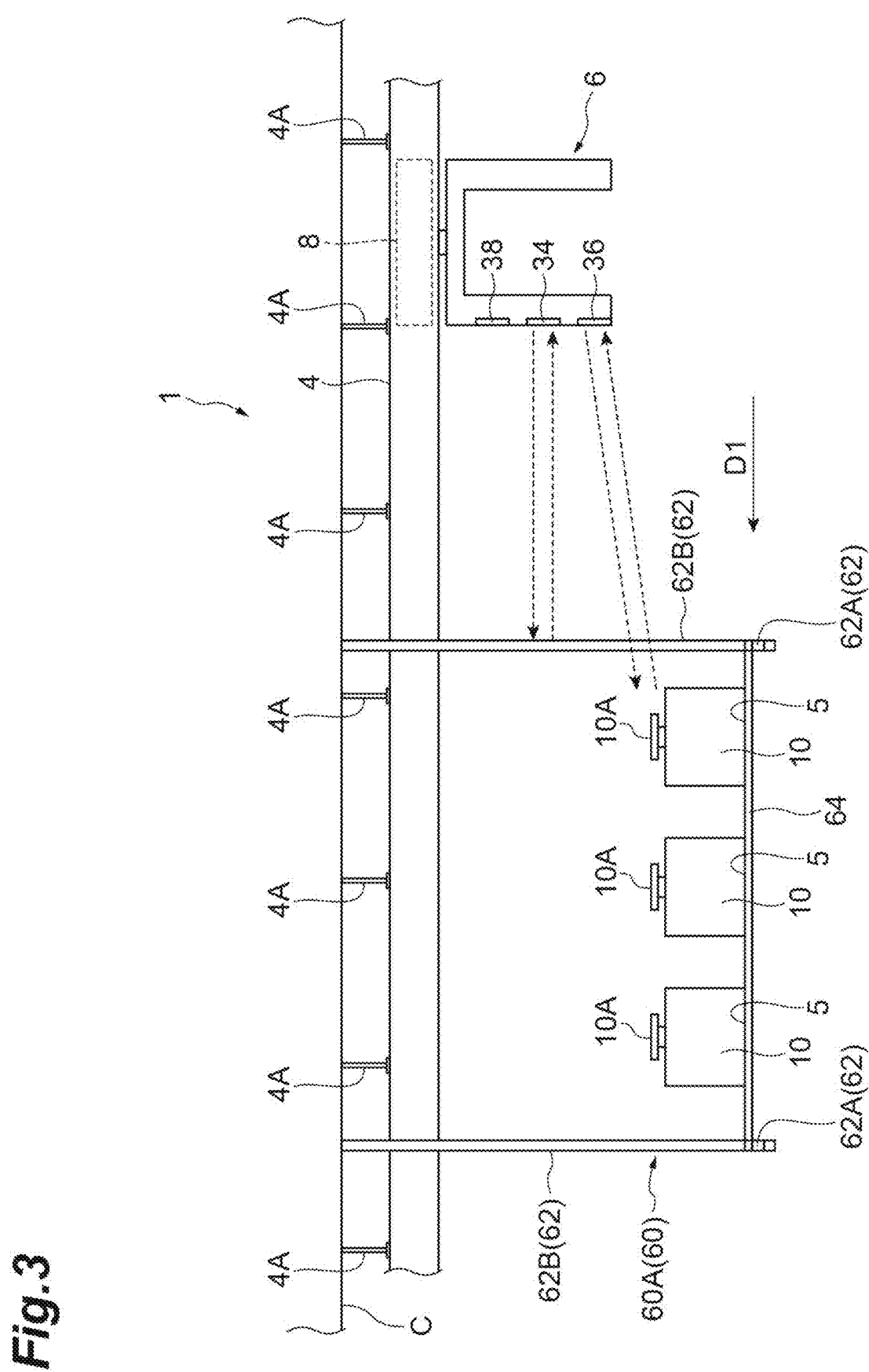
FIG. 3 is a side view of the traveling vehicle and the placement section when viewed from the side.

As illustrated in FIGS. 1 to 3, the track 4 is laid, for example, in the vicinity of a ceiling C that is a space above a worker's head. The track 4 is, for example, suspended from the ceiling C. The track 4 is a predetermined traveling path for the traveling vehicles 6 to travel. The track 4 is supported by struts 4A and 4A. The track 4 defines an internal space that is a space in which a traveling unit 8 described later in detail travels and is separated from an external space.

Around the track 4, a plurality of placement sections 5 are provided. The placement sections 5 are arranged along the track 4 and provided at positions where the traveling vehicle 6 can deliver the container 10. The placement sections 5 include a storage rack 60 and a delivery port. On the storage rack 60, the container 10 is temporarily placed. On the storage rack 60, the container 10 is temporarily placed when the container 10 transported by the traveling vehicle 6 cannot be transferred to a delivery port as a transportation destination, for example, for the reason that another container 10 has been placed on this delivery port. At the delivery port, for example, the container 10 is delivered to and from a semiconductor processing device (not illustrated) such as a cleaning device, a deposition device, a lithography device, an etching device, a thermal treatment device, and a planarization device. The processing device is not limited to a specific device and may be a variety of devices. The following describes the storage rack 60 in detail.

The storage rack 60 includes suspension frames 62 and a shelf 64. The suspension frames 62 are configured to suspend the shelf 64 from the ceiling C. The suspension frames 62 are arranged at regular intervals along the extending direction of the track 4. Each suspension frame 62 includes a shelf-supporting portion 62A and a pair of suspending portions 62B, 62B. The shelf-supporting portion 62A extends along the lateral direction of the shelf 64 (orthogonal to the extending direction of the track) and supports the shelf 64 from below. The pair of suspending portions 62B, 62B each extend in the suspending direction (vertical) from both ends of the shelf-supporting portion 62A to the ceiling C.

The shelf 64 is supported from below by the shelf-supporting portion 62A. In other words, the shelf 64 is laid over between a pair of adjacent shelf-supporting portions 62A, 62A. The shelf 64 is a plate-shaped structure that defines placement sections 5 on which containers 10 may be placed. The shelf 64 may be provided with a purge function of supplying purge gas such as nitrogen gas or dry air into the containers 10 placed on the shelf 64.

Herein, the storage rack 60 includes two types of storage racks 60: a first storage rack 60A, the placement section 5 of which is below the track 4 (the traveling area of the traveling vehicles 6); and a second storage rack 60B, the placement section 5 of which is on the side and below the track 4 (i.e., diagonally below the track 4). Each traveling vehicle 6 elevates and lowers an elevation stage 30 to deliver a container 10 to and from a placement section 5 in the first storage rack 60A. The traveling vehicle 6 delivers a container 10 to and from a placement section 5 formed in the second storage rack 60B, by laterally feeding an elevation driver 28 or the like by a lateral feed unit 24 and by elevating and lowering the elevation stage 30.

The traveling vehicle 6 travels along the track 4 and transports the container 10. The traveling vehicle 6 is configured so that the container 10 can be transferred. The traveling vehicle 6 is an automated overhead traveling vehicle. The number of traveling vehicles 6 included in the traveling vehicle system 1 is not particularly limited and is more than one. Each traveling vehicle 6 includes a main body 7, a traveling unit 8, and a body controller 9. The main body 7 includes a body frame 22, the lateral feed unit 24, a θ drive 26, the elevation driver 28, the elevation stage 30, covers 32, a collision prevention sensor (sensor) 34, an obstacle sensor (sensor) 36, and an image-capturing device 38.

The body frame 22 is connected to the traveling unit 8 and supports the lateral feed unit 24, the θ drive 26, the elevation driver 28, the elevation stage 30, and the covers 32. The lateral feed unit 24 laterally feeds the θ drive 26, the elevation driver 28, and the elevation stage 30 collectively in a direction perpendicular to the extending direction of the track 4. The θ drive 26 turns at least one of the elevation driver 28 and the elevation stage 30 within a predetermined angle range in a horizontal plane. The elevation driver 28 elevates and lowers the elevation stage 30 by reeling or unreeling a suspension such as a wire, a rope, or a belt. The elevation stage 30 includes a chuck 30A and can grip or release the container 10. A pair of the covers 32 are provided, for example, on the front and the back of the traveling vehicle 6 in the traveling direction D1.

The collision prevention sensor 34 is provided near the center, in the height direction, of the front cover 32 of the pair of covers 32, 32. The collision prevention sensor 34 is a reflective sensor configured to detect the presence of an object preceding in the traveling direction and the distance to the object. The collision prevention sensor 34 is provided to detect the presence or absence of another traveling vehicle 6 located ahead in the traveling direction D1. The collision prevention sensor 34 emits light forward in the travel direction D1 and detects the presence or absence of an object located ahead in the travel direction D1 based on whether the reflected light has been detected.

The obstacle sensor 36 is provided on a lower portion of the front cover 32 of the pair of covers 32, 32. Similarly to the collision prevention sensor 34, the obstacle sensor 36 is a reflective sensor configured to detect the presence of an object preceding in the travel direction (an object other than another traveling vehicle 6 located ahead) and the distance to the object. The obstacle sensor 36 is provided to detect the presence or absence of an obstacle (that may enter into the travel space) located ahead in a lower area in the travel direction D1. The obstacle sensor 36 emits light forward in the travel direction D1 and detects the presence or absence of an object located ahead in a lower area in the travel direction D1 based on whether the reflected light has been detected.

Figure 5:
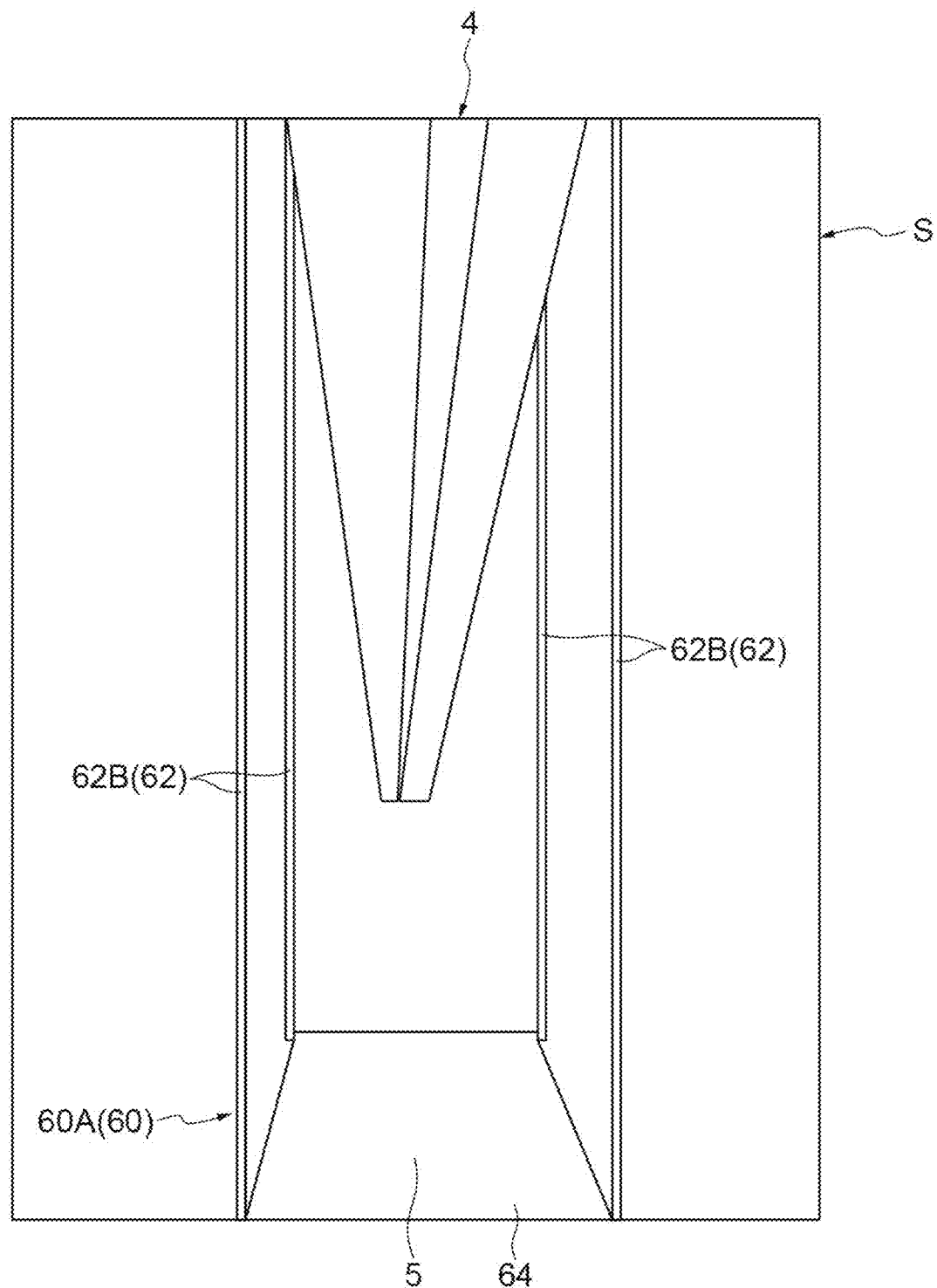
FIG. 5 is an example of a captured image acquired by an image-capturing device.
Figure 6:
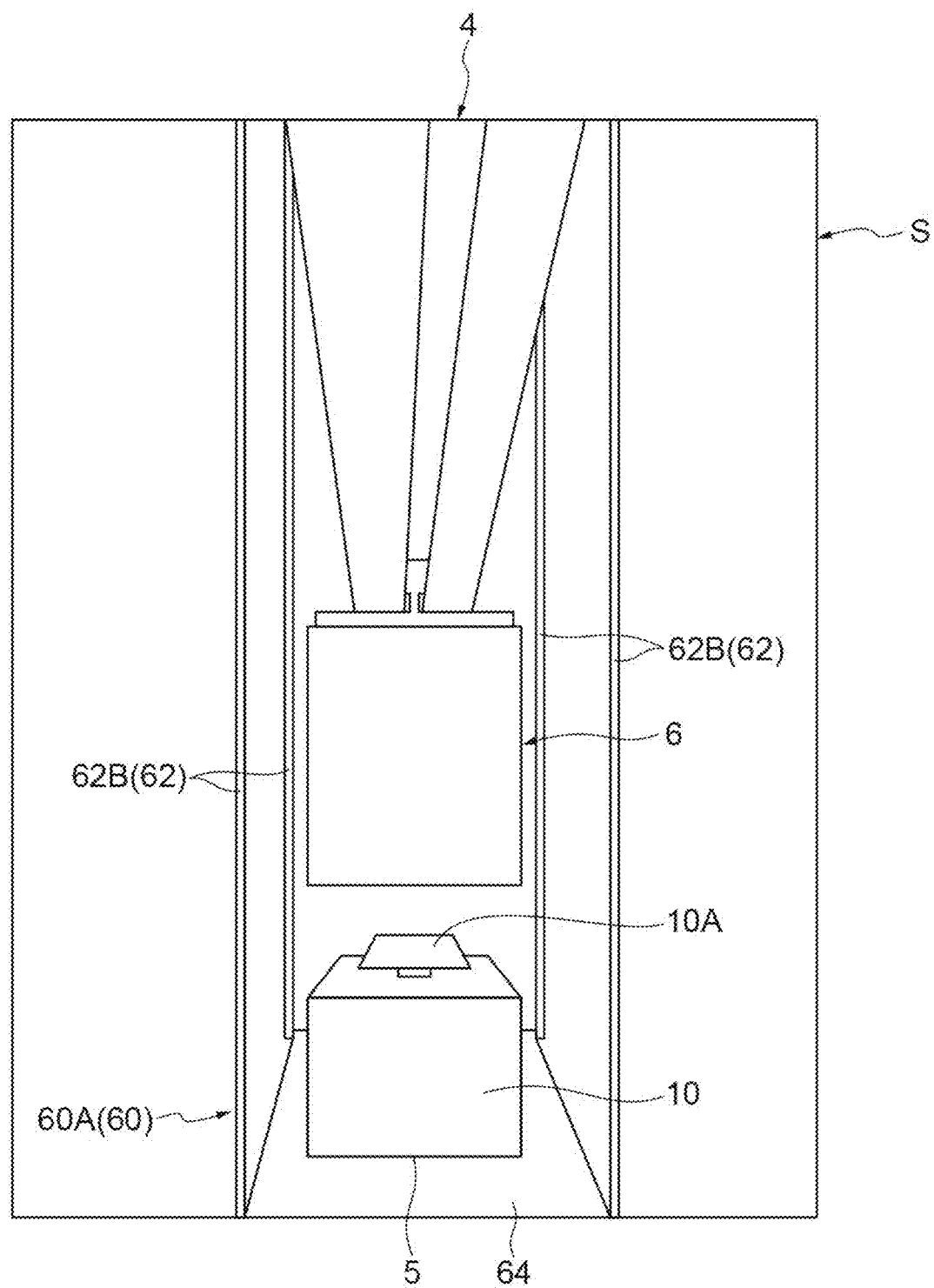
FIG. 6 is an example of a captured image acquired by the image-capturing device or an image stored in a storage.

The image-capturing device 38 is provided on an upper portion of the front cover 32 of the pair of covers 32, 32. The image-capturing device 38 is a device configured to capture an image of an area preceding in the traveling direction D1 and acquire a captured image S as illustrated in FIG. 5 or 6. The image-capturing device 38 captures an image of an area preceding in the traveling direction D1 at the timing when the reflected light has been detected by the collision prevention sensor 34 or the timing when the reflected light has been detected by the obstacle sensor 36. A detection result by the collision prevention sensor 34 and the distance to the object at the time of detection, a detection result by the obstacle sensor 36 and the distance to the object at the time of detection, and a captured image S captured by the image-capturing device 38 are acquired by the body controller 9.

FIG. 5 is an example of a captured image S captured when the collision prevention sensor 34 or the obstacle sensor 36 has detected an object that should not be detected, and FIG. 6 is an example of a captured image S captured when the collision prevention sensor 34 has detected a traveling vehicle 6 located ahead. FIG. 5 is also an example of an image stored in a storage 91.

The traveling unit 8 travels in the internal space defined by the track 4 as described above. The traveling unit 8 mainly includes traveling rollers 42, side rollers 44, power feed cores 46, and a linear DC motor (LDM) 48. The traveling rollers 42 are disposed on the left and right ends at the front and the back of the traveling unit 8. The traveling rollers 42 roll on bottom portions of the track 4. The side rollers 44 sandwich each of the outer wheels of the traveling rollers 42 in the front-back direction. The side rollers 44 are able to come into contact with the side portions of the track 4. The power feed cores 46 are disposed at the front and the back of the traveling unit 8 so as to sandwich the LDM 48 in the left-right direction. Contactless power feeding and contactless transmission/reception of a variety of signals are performed between the power feed cores 46 and a power feeder disposed at the track 4. The power feed cores 46 exchange a signal with the body controller 9. The LDM 48 is provided at each of the front and the back of the traveling unit 8. The LDM 48 uses an electromagnet to produce a magnetic force to cause the traveling unit 8 to travel or stop between the LDM 48 and a magnetic plate disposed on the upper surface of the track 4.

The traveling unit 8 is controlled by the transportation controller 90 described in detail later through the body controller 9. Specifically, a command from the transportation controller 90 is transmitted to the body controller 9, and the body controller 9 having received the command controls the traveling unit 8.

Figure 4:
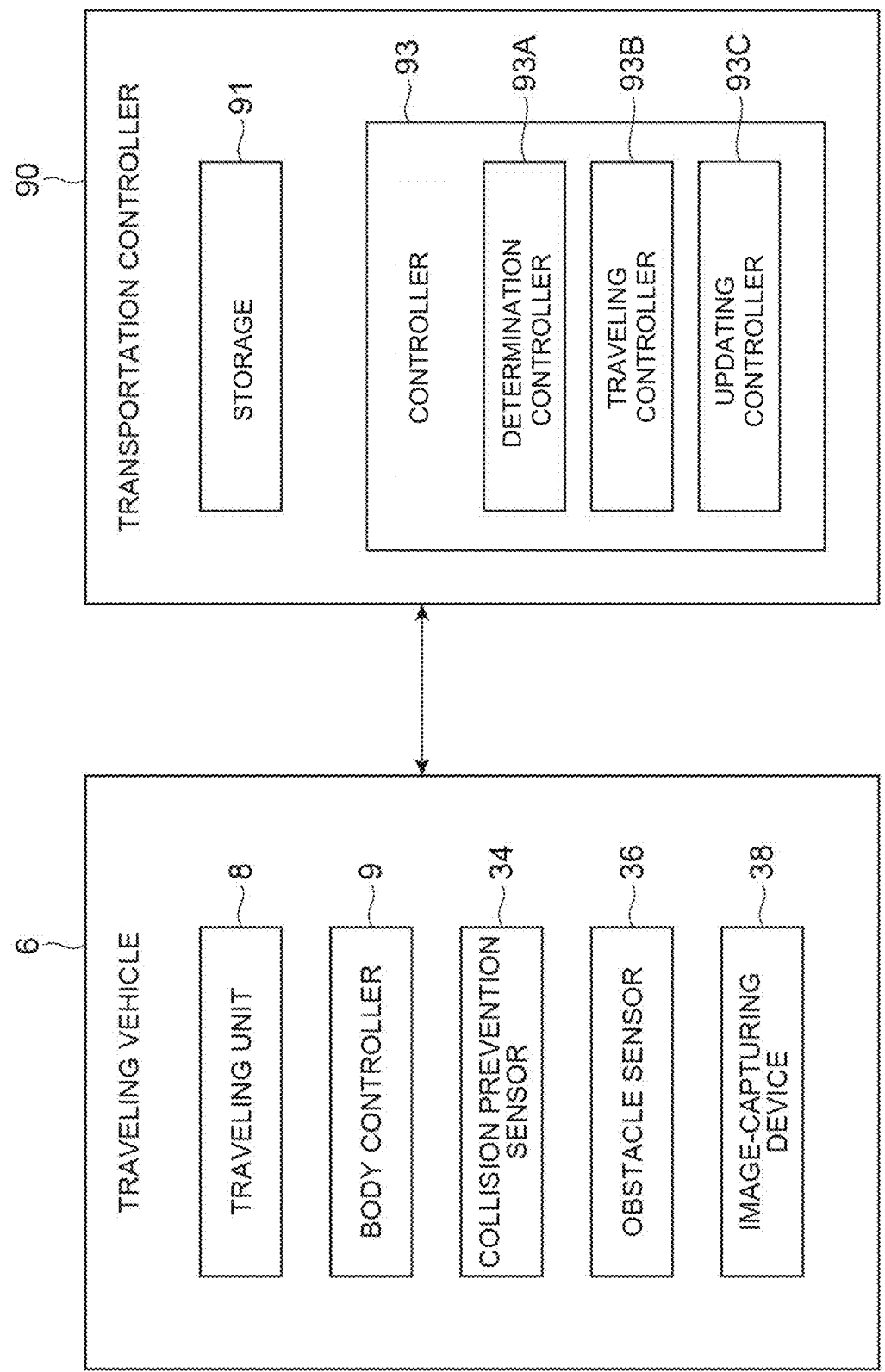
FIG. 4 is a block diagram illustrating a functional configuration of a traveling vehicle system according to an example embodiment of the present invention.

The body controller 9 illustrated in FIGS. 2 and 4 is an electronic controller that may include a central processing unit (CPU), a read only memory (ROM), and a random access memory (RAM). The body controller 9 is configured or programmed to control various operations in the traveling vehicle 6. Specifically, the body controller 9 is configured or programmed to control the traveling unit 8, the lateral feed unit 24, the θ drive 26, the elevation driver 28, and the elevation stage 30. The body controller 9 can be configured, for example, as software that is a program stored in the ROM, loaded into the RAM, and executed by the CPU. The body controller 9 may be configured as hardware with, for example, electronic circuitry.

The body controller 9 is configured or programmed to control the image-capturing device 38 to acquire a captured image at the timing when an object has been detected by the collision prevention sensor 34. The body controller 9 also may be configured or programmed to control the image-capturing device 38 to acquire a captured image at the timing when an object has been detected by the obstacle sensor 36. The body controller 9 transmits a detection result by the collision prevention sensor 34 and the distance to the object at the time of detection, a detection result by the obstacle sensor 36 and the distance to the object at the time of detection, and a captured image S captured by the image-capturing device 38 to the transportation controller 90. The body controller 9 communicates with the transportation controller 90 using, for example, the power feeder (not illustrated) provided in the track 4.

The transportation controller 90 illustrated in FIGS. 1 and 4 is configured or programmed to control traveling of the traveling vehicle 6. The transportation controller 90 may include an electronic controller including a CPU, a ROM, and a RAM, and is provided in a manner capable of communicating with each traveling vehicle 6. The transportation controller 90 includes the storage 91 and a controller 93.

The storage 91 stores an image including objects that do not become obstacles to traveling of the traveling vehicle 6 as illustrated in FIG. 5, for example. Hereafter, an object detected by the collision prevention sensor 34 or the obstacle sensor 36, which does not become an obstacle to traveling of the traveling vehicle 6, is referred to as a "specific object". An object to be a specific object is set in consideration of an object detection range of each of the collision prevention sensor 34 and the obstacle sensor 36. In the present example embodiment, the suspending portions 62B of the storage rack 60 are set as specific objects for the collision prevention sensor 34, and the flange 10A of the container 10 is set as a specific object for the obstacle sensor 36. Thus, a plurality of images of the suspending portions 62B and a plurality of images of the flanges 10A are stored in the storage 91.

In further detail, the images of the suspension frames 62 and the images of the flanges 10A corresponding to the respective positions on the traveling path are stored in the storage 91. Specifically, for example, when positions P1, P2, P3, . . . , PN are set at regular intervals along the track 4 as illustrated in FIG. 1, images of the suspending portions 62B and images of the flanges 10A, which are assumed to have been captured from traveling vehicles 6 at the respective positions P1, P2, P3, . . . , PN, are stored in the storage 91.

The controller 93 can be configured, for example, as software that is a program stored in the ROM, loaded into the RAM, and executed by the CPU. The controller 93 may be configured as hardware with electronic circuitry, for example. The controller 93 may be configured or programmed to include a determination controller 93A, a traveling controller 93B, and an updating controller 93C by cooperative operation of the hardware such as the CPU, the RAM, and the ROM and the software such as the program.

The determination controller 93A determines, based on a captured image S captured by the image-capturing device 38 when an object has been detected by the collision prevention sensor 34 and on the images stored in the storage 91 (see FIG. 5), whether the object detected by the collision prevention sensor 34 is an object (e.g., a suspending portion 62B of the storage rack 60 as a specific object) that does not become an obstacle to traveling of the traveling vehicle 6. The determination controller 93A also determines, based on a captured image S captured by the image-capturing device 38 when an object has been detected by the obstacle sensor 36 and on the images stored in the storage 91, whether the object detected by the obstacle sensor 36 is an object (e.g., the flange 10A of a container 10 as a specific object) that does not become an obstacle to traveling of the traveling vehicle 6.

Herein, an example has been described in which, in the case of the collision prevention sensor 34, it is determined whether the detected object is a suspending portion 62B of the storage rack 60, and in the case of the obstacle sensor 36, it is determined whether the detected object is the flange 10A of a container 10. However, the present invention is not limited to this. For example, in either of the case of the collision prevention sensor 34 and the case of the obstacle sensor 36, it may be determined whether the detected object is a suspending portion 62B of the storage rack 60 or the flange 10A of a container 10. Examples of the specific objects may include the shelf 64 of the storage rack 60.

The following describes an example of a method by which the determination controller 93A determines whether the object is a specific object. For example, the determination controller 93A determines whether the object detected by the collision prevention sensor 34 is an object (e.g., a suspending portion 62B of the storage rack 60) that does not become an obstacle to traveling of the traveling vehicle 6 based on the captured image S captured by the image-capturing device 38 when the object has been detected by the collision prevention sensor 34 and an image, among images stored in the storage 91, that contains suspending portions 62B of the storage rack 60 corresponding to a position where the object has been detected by the collision prevention sensor 34. The determination controller 93A determines whether the object detected by collision prevention sensor 34 is the suspending portion 62B of the storage rack 60 based on image matching (pattern matching) between the above-mentioned captured image S and the image including the suspending portions 62B of the above-mentioned storage rack 60.

For example, the determination controller 93A determines whether the object detected by the obstacle sensor 36 is an object (e.g., the flange 10A of a container 10) that does not become an obstacle to traveling of the traveling vehicle 6 based on the captured image S captured by the image-capturing device 38 when the object has been detected by the obstacle sensor 36 and an image, among images stored in the storage 91, that includes the flange 10A of a container 10 corresponding to a position where the object has been detected by the obstacle sensor 36. The determination controller 93A determines whether the object detected by obstacle sensor 36 is the flange 10A of a container 10 based on image matching (pattern matching) between the above-mentioned captured image S and the image including the flange 10A of the above-mentioned container 10.

In another example of the method, the determination controller 93A may cause artificial intelligence (AI) to determine whether only the suspending portions 62B of the storage rack 60 are included in the captured image S captured by the image-capturing device 38 when the object has been detected by the collision prevention sensor 34, in which the AI was made to learn such a determination based on a plurality of images including the suspending portions 62B of the storage rack 60. If only the suspending portions 62B of the storage rack 60 can be seen in the above-mentioned captured image, the determination controller 93A determines that the object detected by the collision prevention sensor 34 is a suspending portion 62B of the storage rack 60 and does not become an obstacle to traveling of the traveling vehicle 6. The method of determining objects detected by the obstacle sensor 36 is similar, and thus explanation here is omitted.

The traveling controller 93B executes collision avoidance control when an object has been detected by the collision prevention sensor 34. Specifically, the traveling controller 93B transmits a command to decelerate or stop to the body controller 9 of the traveling vehicle 6 that has transmitted the detection result by the collision prevention sensor 34 and the distance to the object at the time of detection. The body controller 9 that has received this command controls the traveling unit 8 to decelerate or stop the traveling vehicle 6. If the determination controller 93A has determined that the object detected by the collision prevention sensor 34 is a specific object (e.g., a suspending portion 62B of the storage rack 60), the traveling controller 93B stops the execution of the collision avoidance control. Specifically, the traveling controller 93B transmits a command to cancel the command to decelerate or stop to the body controller 9 of the traveling vehicle 6 that has transmitted the detection result by the collision prevention sensor 34 and the distance to the object at the time of detection.

The traveling controller 93B executes the collision avoidance control when an object has been detected by the obstacle sensor 36. Specifically, the traveling controller 93B transmits a command to decelerate or stop to the body controller 9 of the traveling vehicle 6 that has transmitted the detection result by the obstacle sensor 36 and the distance to the object at the time of detection. The body controller 9 that has received this command controls the traveling unit 8 to decelerate or stop the traveling vehicle 6. If the determination controller 93A has determined that the object detected by the obstacle sensor 36 is a specific object (e.g., the flange 10A of a container 10), the traveling controller 93B stops the execution of the collision avoidance control. Specifically, the traveling controller 93B transmits a command to cancel the command to decelerate or stop and return to normal traveling to the body controller 9 of the traveling vehicle 6 that has transmitted the detection result by the obstacle sensor 36 and the distance to the object at the time of detection.

In the present example embodiment, the traveling controller 93B executes the collision avoidance control when an object has been detected by the collision prevention sensor 34 or the obstacle sensor 36 and the traveling vehicle 6 approaches until the distance to the object becomes a predetermined distance, and stops the execution of the collision avoidance control if the determination controller 93A has determined the object detected by the collision prevention sensor 34 or the obstacle sensor 36 is a specific object before the traveling vehicle 6 approaches until the distance to the object reaches the predetermined distance. In other words, the traveling controller 93B causes the traveling vehicle 6 to travel in a state in which it can execute the collision avoidance control at any time when an object has been detected by the collision prevention sensor 34 or the obstacle sensor 36. When the distance to the object in the traveling vehicle 6 has reached the predetermined distance, the traveling controller 93B determines, based on the result of the determination by the determination controller 93A, whether to cause the traveling vehicle 6 to execute the collision avoidance control or to cause the traveling vehicle 6 to continue traveling in the current state without executing the collision avoidance control (by stopping the execution of the collision avoidance control).

Herein, an example has been described in which the above-described determination is made by the determination controller 93A during a period that the traveling vehicle 6 travels the predetermined distance after an object has been detected by the collision prevention sensor 34 or the obstacle sensor 36. However, this determination by the determination controller 93A may be made at the same time when the object has been detected by the collision prevention sensor 34 or the obstacle sensor 36.

When the determination controller 93A has determined that the object detected by the collision prevention sensor 34 or the obstacle sensor 36 is a specific object (e.g., a suspending portion 62B of the storage rack 60 or the flange 10A of a container 10), the updating controller 93C stores the captured image S used for the concerned determination in the storage 91. Specifically, the updating controller 93C updates a pre-stored image including the suspending portion 62B of the storage rack 60 or the flange 10A of the container 10. More specifically, the updating controller 93C updates images corresponding to positions on the traveling path.

The operations and effects of the traveling vehicle system 1 in the above-described example embodiment will be described. In the traveling vehicle system 1 according to the example embodiment, the collision avoidance control is executed when an object has been detected by the collision prevention sensor 34 or the obstacle sensor 36, and thus the traveling vehicle 6 can be prevented from colliding with an obstacle. Furthermore, in the traveling vehicle system 1 according to the above-described example embodiment, the execution of the collision avoidance control is stopped if the object detected by the collision prevention sensor 34 or the obstacle sensor 36 has been determined to be a specific object that does not hinder traveling of the traveling vehicle 6, and thus unnecessary execution of the collision avoidance control when the collision prevention sensor 34 or the obstacle sensor 36 has detected an object that is not an obstacle can be reduced.

In the traveling vehicle system 1 according to the above-described example embodiment, if an object has been detected by the collision prevention sensor 34 or the obstacle sensor 36, on the assumption that the collision avoidance control is executed, the collision avoidance control is stopped only when the detected object has been determined from the captured image S to be an object (specific object) that does not hinder traveling of the traveling vehicle 6. The traveling vehicle system 1 according to the above-described example embodiment thus configured differs significantly from the above-described example embodiment in which the collision avoidance control is not executed until the detected object has been determined from the captured image S to be an obstacle that hinders traveling of the traveling vehicle 6 even if the object has been detected by the collision prevention sensor 34 or obstacle sensor 36. In the latter example embodiment, for example, the collision avoidance control is not executed if an object has not been determined to be an obstacle based on the captured image S for any reason. By contrast, in the traveling vehicle system 1 according to the above-described example embodiment, the collision avoidance control is reliably executed even if an object has not been determined to be a specific object based on the captured image S for any reason. In other words, in the traveling vehicle system 1 according to the above-described example embodiment, a fail-safe is considered for the risk of colliding with an obstacle.

In determining whether traveling of the traveling vehicle 6 is hindered, the traveling vehicle system 1 according to the above-described example embodiment does not determine whether an obstacle that hinders the traveling vehicle 6 is included in the captured image S but determines whether an object that does not hinder the traveling vehicle 6 is included therein. By this control, the number of objects to be determined can be narrowed down in determining whether traveling of the traveling vehicle 6 is hindered, and thus the number of images to be stored in the storage 91 can be reduced. Even when AI is used to determine whether an object to be determined is included in a captured image, the number of images for the AI to learn can be reduced.

In the traveling vehicle system 1 according to the above-described example embodiment, the traveling controller 93B does not execute the collision avoidance control until the distance between the traveling vehicle 6 and an object reaches the predetermined distance after the object has been detected by the collision prevention sensor 34 or obstacle sensor 36. By this control, unnecessary execution of the collision avoidance control described above can be avoided even when the determination by the determination controller 93A takes time.

In the traveling vehicle system 1 according to the above-described example embodiment, the storage 91 stores images corresponding to the respective positions on the traveling path. The way the above-described specific object is visible differs depending on positions on the traveling path, i.e., the way it is captured by the image-capturing device 38 differs. However, in the traveling vehicle system 1 according to the above-described example embodiment, whether the object is the specific object is determined based on the image including the specific object that is captured at high possibility at the time when it has been detected by the collision prevention sensor 34 or obstacle sensor 36, and thus determination accuracy can be increased.

In the traveling vehicle system 1 according to the above-described example embodiment, when an object detected by the collision prevention sensor 34 or the obstacle sensor 36 has been determined to be a specific object, the captured image S used for the concerned determination is stored in the storage 91. With this configuration, whether the object is a specific object can be determined based on an image corresponding to a site where the traveling vehicle 6 is actually traveling, and thus the accuracy of the determination by the determination controller 93A can be further increased.

Although example embodiments have been described above, aspects of the present invention is not limited to the above-described example embodiments. Various modifications can be made without departing from the gist of the present invention.

First Modification

The detection range of the collision prevention sensor 34 may be set to switch in accordance with traveling positions. For example, the detection range of the collision prevention sensor 34 may be set such that, in a straight section, the detection range is set forward in a band in the traveling direction and, in a curved section, the detection range is set diagonally forward in a band along the traveling direction and also the detection range in the traveling direction is set to be shorter than in the straight section. In this configuration, the determination controller 93A may determine whether the object detected by the collision prevention sensor 34 is a specific object based on a partial image that falls within the detection range of the collision prevention sensor 34 out of the entire captured image S and based on the image stored in the storage 91. The detection range of the obstacle sensor 36 may be similarly configured, and the determination controller 93A configured to determine whether an object detected by the obstacle sensor 36 is a specific object may also be similarly configured.

In the traveling vehicle system 1 according to the first modification, the object detected by the collision prevention sensor 34 or the obstacle sensor 36 is reliably included in the captured image S to be determined by the determination controller 93A, and also whether the object detected by the collision prevention sensor 34 or the obstacle sensor 36 is a specific object can be efficiently determined.

Second Modification

In the traveling vehicle system 1 according to the above-described example embodiments and the modification described above, examples have been described in which all of the storage 91, the determination controller 93A, and the traveling controller 93B are provided in the transportation controller 90 that is separate from the traveling vehicle 6. However, at least one of the storage 91, the determination controller 93A, and the traveling controller 93B may be provided in the traveling vehicle 6. For example, the traveling vehicle 6 may include the collision prevention sensor 34 and the obstacle sensor 36 that are reflective sensors configured to detect the presence of an object preceding in the traveling direction and the distance to the object, the image-capturing device 38 configured to capture an image of an area preceding in the traveling direction, the storage 91 configured to store an image including a specific object that does not become an obstacle to traveling of the traveling vehicle 6; the determination controller 93A configured or programmed to determine whether the object detected by the collision prevention sensor 34 or the obstacle sensor 36 is the specific object, based on a captured image captured by the image-capturing device 38 when the object has been detected by the collision prevention sensor 34 or the obstacle sensor 36 and on the image stored in the storage 91, and the traveling controller 93B configured or programmed to execute the collision avoidance control when the object has been detected by the collision prevention sensor 34 or the obstacle sensor 36 and stop execution of the collision avoidance control in a case where the determination controller 93A has determined that the object detected by the collision prevention sensor 34 or the obstacle sensor 36 is the specific object.

Even with this configuration of the traveling vehicle 6, it is possible to reduce the unnecessary execution of the collision avoidance control due to detection of the object that is not an obstacle can be reduced while preventing collisions with obstacles.

Other Modifications

In the traveling vehicle systems 1 according to the example embodiments and the modifications above, examples have been described in which images of suspending portions 62B and images of flanges 10A corresponding to the respective positions on the traveling path are stored in the storage 91. However, for example, regardless of the positions on the traveling path, images of the suspending portions 62B and images of the flanges 10A from various angles and various distances may be stored therein. The determination controller 93A may determine whether the object detected by the collision prevention sensor 34 or the obstacle sensor 36 is a specific object based on the image captured by the image-capturing device 38 and the images stored in the storage 91.

In the traveling vehicle system 1 according to the example embodiments and the modifications above, examples have been described in which the overhead traveling vehicle 6 is used as an example of a traveling vehicle. However, the present invention is not limited to this. Each aspect of the example embodiments of the present invention and modifications thereof may be applied to a traveling vehicle configured to transport an article along a track 4 installed on a floor or trestles, a traveling vehicle such as a stacker crane configured to travel on a track disposed along a storage rack and deliver and receive an article to and from the storage rack, and a traveling vehicle such as an automatic guided vehicle (AGV) configured to travel along a predetermined traveling path on a floor or the like.

The technical subject matter of the aspects of example embodiments of the present invention may be described as follows.

[1]

A traveling vehicle system in which a plurality of traveling vehicles travel along a predetermined traveling path, the traveling vehicle system including the traveling vehicles each including a reflective sensor to detect a presence of an object preceding in a traveling direction and a distance to the object and an image-capturing device to capture an image of an area preceding in the traveling direction, a storage to store an image including a specific object that does not become an obstacle to traveling of each traveling vehicle, a determination controller configured or programmed to determine whether the object detected by the sensor is the specific object, based on a captured image captured by the image-capturing device when the object has been detected by the sensor and on the image stored in the storage, and a traveling controller configured or programmed to execute collision avoidance control when the object has been detected by the sensor and stop execution of the collision avoidance control in a case where the determination controller has determined that the object detected by the sensor is the specific object.

[2]

The traveling vehicle system according to [1], wherein the traveling controller is configured or programmed to execute the collision avoidance control when the object has been detected by the sensor and the traveling vehicle approaches until a distance to the object reaches a predetermined distance, and stops the execution of the collision avoidance control in a case where the determination controller has determined that the object detected by the sensor is the specific object before the traveling vehicle approaches until the distance to the object reaches the predetermined distance.

[3]

The traveling vehicle system according to [1] or [2], wherein the storage stores the image corresponding to each position on the traveling path.

[4]

The traveling vehicle system according to any one of [1] to [3], further including an updating controller configured or programmed to, when the determination controller has determined that the object detected by the sensor is the specific object, store the captured image used for the determination in the storage.

[5]

The traveling vehicle system according to any one of [1] to [4], wherein a detection range of the sensor is set to switch in accordance with a traveling position, and the determination controller is configured or programmed to determine whether the object detected by the sensor is the specific object, based on a partial image that falls within the detection range of the sensor out of an entirety of the captured image and on the image stored in the storage.

[6]

The traveling vehicle system according to any one of [1] to [5], wherein the collision avoidance control includes control to decelerate or stop the traveling vehicle.

[7]

A traveling vehicle to travel along a predetermined traveling path, the traveling vehicle including a reflective sensor to detect a presence of an object preceding in a traveling direction and a distance to the object, an image-capturing device to capture an image of an area preceding in the traveling direction, a storage to store an image including a specific object that does not become an obstacle to traveling of the traveling vehicle, a determination controller configured or programmed to determine whether the object detected by the sensor is the specific object, based on a captured image captured by the image-capturing device when the object has been detected by the sensor and on the image stored in the storage; and a traveling controller configured or programmed to execute collision avoidance control when the object has been detected by the sensor and stop execution of the collision avoidance control in a case where the determination controller has determined that the object detected by the sensor is the specific object.

While example embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A traveling vehicle system comprising:
a plurality of traveling vehicles to travel along a track and each including a reflective sensor to detect a presence of an object preceding in a traveling direction and a distance to the object and an image-capturing device to capture an image of an area preceding in the traveling direction;
a storage to store an image of a specific object observable from each of the plurality of traveling vehicles traveling on the track that does not become an obstacle to traveling of each of the plurality of traveling vehicles;
a determination controller configured or programmed to determine whether the object detected by the sensor is the specific object, based on a captured image captured by the image-capturing device when the object has been detected by the sensor and on the image stored in the storage; and
a traveling controller configured or programmed to execute collision avoidance control for one of the plurality of traveling vehicles when the object has been detected by the sensor of the one of the plurality of traveling vehicles while the one of the plurality of traveling vehicles is traveling and to stop execution of the collision avoidance control while the one of the plurality of traveling vehicles continues to travel in a case where the determination controller has determined that the object detected by the sensor is the specific object.

2. The traveling vehicle system according to claim 1, wherein the traveling controller is configured or programmed to execute the collision avoidance control when the object has been detected by the sensor and the one of the plurality of traveling vehicles approaches until the distance to the object reaches a predetermined distance, and stops the execution of the collision avoidance control in a case where the determination controller has determined that the object detected by the sensor is the specific object before the one of the plurality of traveling vehicles approaches until the distance to the object reaches the predetermined distance.

3. The traveling vehicle system according to claim 2, wherein the storage stores the image corresponding to each position on the track.

4. The traveling vehicle system according to claim 3, further comprising an updating controller configured or programmed to, when the determination controller has determined that the object detected by the sensor is the specific object, store the captured image used for the determination in the storage.

5. The traveling vehicle system according to claim 4, wherein
a detection range of the sensor is switchable in accordance with a traveling position; and
the determination controller is configured or programmed to determine whether the object detected by the sensor is the specific object, based on a partial image that falls within the detection range of the sensor out of an entirety of the captured image and on the image stored in the storage.

6. The traveling vehicle system according to claim 3, wherein
a detection range of the sensor is switchable in accordance with a traveling position; and
the determination controller is configured or programmed to determine whether the object detected by the sensor is the specific object, based on a partial image that falls within the detection range of the sensor out of an entirety of the captured image and on the image stored in the storage.

7. The traveling vehicle system according to claim 2, further comprising an updating controller configured or programmed to, when the determination controller has determined that the object detected by the sensor is the specific object, store the captured image used for the determination in the storage.

8. The traveling vehicle system according to claim 2, wherein
a detection range of the sensor is switchable in accordance with a traveling position; and
the determination controller is configured or programmed to determine whether the object detected by the sensor is the specific object, based on a partial image that falls within the detection range of the sensor out of an entirety of the captured image and on the image stored in the storage.

9. The traveling vehicle system according to claim 1, wherein the storage stores the image corresponding to each position on the track.

10. The traveling vehicle system according to claim 9, further comprising an updating controller configured or programmed to, when the determination controller has determined that the object detected by the sensor is the specific object, store the captured image used for the determination in the storage.

11. The traveling vehicle system according to claim 9, wherein
a detection range of the sensor is set to switch in accordance with a traveling position; and
the determination controller determines whether the object detected by the sensor is the specific object, based on a partial image that falls within the detection range of the sensor out of an entirety of the captured image and on the image stored in the storage.

12. The traveling vehicle system according to claim 1, further comprising an updating controller configured or programmed to, when the determination controller has determined that the object detected by the sensor is the specific object, store the captured image used for the determination in the storage.

13. The traveling vehicle system according to claim 12, wherein
a detection range of the sensor is switchable in accordance with a traveling position; and
the determination controller is configured or programmed to determine whether the object detected by the sensor is the specific object, based on a partial image that falls within the detection range of the sensor out of an entirety of the captured image and on the image stored in the storage.

14. The traveling vehicle system according to claim 1, wherein
a detection range of the sensor is switchable in accordance with a traveling position; and
the determination controller is configured or programmed to determine whether the object detected by the sensor is the specific object, based on a partial image that falls within the detection range of the sensor out of an entirety of the captured image and on the image stored in the storage.

15. The traveling vehicle system according to claim 1, wherein the collision avoidance control includes control to decelerate or stop the one of the plurality of traveling vehicles.

16. A traveling vehicle to travel along a track, the traveling vehicle comprising:
a reflective sensor to detect a presence of an object preceding in a traveling direction and a distance to the object;
an image-capturing device to capture an image of an area preceding in the traveling direction;
a storage to store an image of a specific object observable from the traveling vehicle traveling on the track that does not become an obstacle to traveling of the traveling vehicle;
a determination controller configured or programmed to determine whether the object detected by the sensor is the specific object, based on a captured image captured by the image-capturing device when the object has been detected by the sensor and on the image stored in the storage; and
a traveling controller configured or programmed to execute collision avoidance control when the object has been detected by the sensor while the traveling vehicle is traveling and stop execution of the collision avoidance control while the traveling vehicle continues to travel in a case where the determination controller has determined that the object detected by the sensor is the specific object.

* * * * *